March 12, 1935.   J. L. TALLANT ET AL   1,994,007
HOSE COUPLING
Filed Sept. 2, 1933
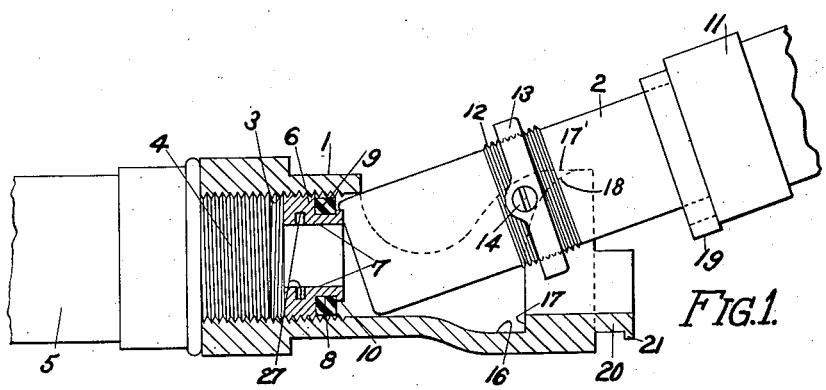
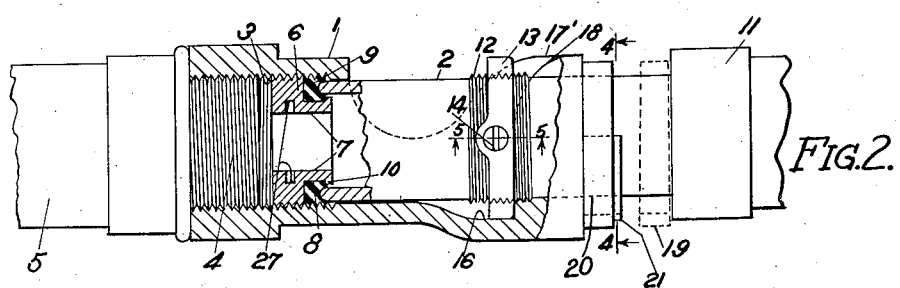
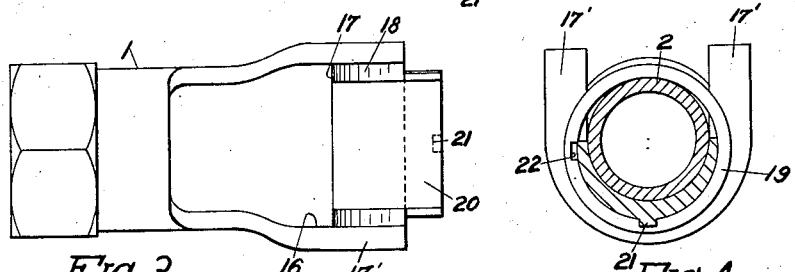
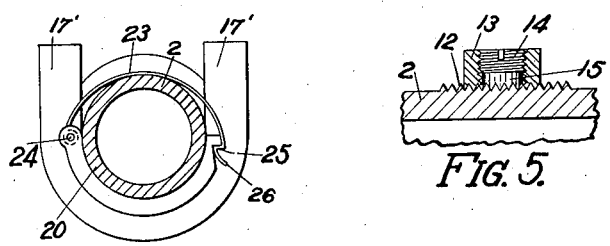
INVENTOR.
JEROME L. TALLANT
JOHN S. WRIGHT
BY
ATTORNEYS.

Patented Mar. 12, 1935

1,994,007

UNITED STATES PATENT OFFICE 1,994,007

HOSE COUPLING

Jerome L. Tallant, San Francisco, and John S. Wright, Alameda, Calif.

Application September 2, 1933, Serial No. 688,044

7 Claims. (Cl. 285—143)

This invention relates to couplings and has for its object a coupling adapted to quickly and easily effect a connection between separate hose lines, pipe lines, or between a hose line and a valve or rigid pipe line, etc.

Another object is a coupling that may easily and quickly be disjoined to break the connection, but which coupling, when connected, is locked against being accidentally disconnected, and a still further object is the provision of means in such coupling for effecting a tight connection under variable conditions. Other objects and advantages will appear in the following description and drawing.

In the drawing, Fig. 1 represents our improved coupling in position to effect a connection, one part of the coupling being in section.

Fig. 2 represents the coupling with the parts connected for use and the locking means in place, one of the parts of the coupling being broken away and in section for clarity.

Fig. 3 is a plan view of one of the parts of the coupling only of Figs. 1 and 2.

Fig. 4 is a sectional view of Fig. 2 taken along the line 4—4 thereof.

Fig. 5 is an enlarged fragmentary sectional view taken along the line 5—5 of Fig. 2.

Fig. 6 shows another form of locking device for securing the coupling members together, one only of the members being in section and the other being in end elevation.

In detail the coupling comprises a female member 1 and a male member 2. The female member is an elongated casting, about one-half of the length of the casting, being cylindrical and internally threaded as at 3, and the other half of the length of the casting being generally semi-cylindrical.

The threads 3 are adapted for engagement with the threaded end 4 of an ordinary hose connection as is secured to a hose 5, or to the threaded end of a faucet or rigid pipe line, the threaded end 4 being substantially the same in any such members.

Within the cylindrical end of the casting inwardly of the end of the member 4 is an externally threaded nut 6 centrally apertured at 7 to pass the water or fluid therethrough.

Nut 6 is reduced at its inner end as at 8 for supporting a washer 9 therearound and the inner end of this reduced portion is provided with a relatively short outwardly extending flange 10 to secure the washer against axial movement over the end of the nut, although the washer being ordinarily of rubber is easily stretched over the flange for placing it on the nut.

The male member 2 comprises an elongated pipe section or hollow cylindrical casting connected at one end to a hose fitting 11 for attaching to a hose in the same manner as hose 5 is connected to member 1.

Intermediate of its opposite ends the member 2 is externally threaded for a short distance as at 12 and on this threaded portion is a ring 13 adapted to be screwed back and forth thereon. A screw 14 is threaded into a hole extending transversely through a hole in the ring, the inner end of the screw engaging the outer end of a small, loose block 15 that is threaded on its inner end to fit the threads 12. This arrangement provides for locking the ring at any point along the threads 12 merely by tightening screw 14. Fig. 5 shows the locking means most clearly.

At a point intermediate the ends of the semi-cylindrical portion of member 1, the semi-cylindrical portion is enlarged as at 16, which enlargement terminates adjacent the outer end of said portion in a square shoulder 17, which shoulder extends around the semi-cylindrical portion in a plane extending transversely thereof. This enlarged portion is for the purpose of receiving the ring 13 whereby the members 1 and 2 can be brought into axial alignment with the outer end of the member 1 sealed against the outer axially facing surface of washer 9 as indicated in Fig. 2.

The portion of member 1 axially outwardly of the enlargement 16 is extended at its opposite sides to form parallel ears 17' and the shoulder 17 extends along the inner axially facing sides of these ears, but are beveled or slanted at the upper terminations of the ears as at 18.

When the outer end of member 2 is inserted into the cylindrical portion of member 1, as in Fig. 1, the ring 13 engages against the slanted portions of shoulder 17 at two points on opposite sides of the member 1 and upon forcing the members 1 and 2 into axial alignment the ring slides downwardly on the shoulder until the ring is squarely seated on its axially facing side against the shoulder as indicated in Fig. 2.

At the same time the members 1 and 2 are brought into axial alignment, as described, the outer end of member 2 is firmly seated against the washer 9, slightly compressing the washer as shown in Fig. 2. When thus connected, the members 1 and 2 will remain securely coupled together under ordinary conditions, but if the coupling is "buckled", the parts will be disconnected.

To insure against accidental disconnection or disjoining of the coupling, we provide a loose locking ring 19 on member 2 between the ring 13 and the hose connection, which locking ring is of a lesser internal diameter than ring 13, and therefore cannot slip off member 2.

The extreme outer end of member 1 is extended into a semi-cylindrical shaped extension 20 over which ring 19 can be slipped as seen in Fig. 4. This extension 20 is provided with a radially extending lug 21 on its outer surface and the ring 19 has an axially extending slot 22 on its inner surface adapted to pass the lug. After passing the ring over the end of the extension, it is turned, as in Fig. 4, so that the ring cannot be slipped off the extension, but will be retained thereon by lug 21. When locked together as above described, the coupling is secure against accidental disconnection, yet the parts are easily separated by merely turning the ring until the slot 22 will pass the lug 21, then slipping the ring axially over the end of the extension and then "breaking" the connection to the position shown in Fig. 1.

Another means of locking the coupling is shown in Fig. 6, wherein a clip 23 of spring material is hinged at 24 to one side of the extension 20 and the opposite side of the extension is notched to receive hook 25 formed on the opposite end of clip 23. The hook 25 has an outwardly extending portion 26 that is easily engaged by the thumb of the operator to force the hook out of the notch to separate the parts.

The mounting of the nut 6 and ring 13 so that either the nut or the ring may be moved axially of the member 1 or 2, respectively, is of great importance, since the relatively small amount of movement axially of the member 2 upon its being coupled to member 1 in the manner described, requires extreme accuracy in the dimensions of the parts or the coupling is useless. It will be noted that recesses 27 are provided on nut 6 for engagement of a tool for facilitating the adjustment of the nut.

To procure this accuracy in all sizes of pipes, both adjustments are necessary, since there are variations in the length of the hose valve, or pipe fittings to which the member 1 is attached. Also, the washers 9 are subject to wear and there are variations in the coupling members themselves.

Also the locking means for preventing the coupling from being accidentally disconnected is of high importance.

We are aware of various other attempts to provide a coupling of a generally similar nature, but insofar as we are aware, none of these attempts has been successful due to the lack of adjustments adapted to accomplish the results as above noted and to the lack of any means for preventing accidental disconnecting of the parts.

Having described our invention, we claim:

1. A coupling comprising a male section and a female section each having a body portion provided with a bore therethrough, separate means on each of said sections respectively arranged and adapted to coact upon movement of the sections from an angular position relatively with the sections uncoupled to a tightly coupled position with the bores in axial alignment, said separate means respectively formed to permit rotation of the sections relatively when the sections are in tightly coupled position and one of said means including a member movable relative to the sections for regulating the degree of tightness between the sections when coupled together to compensate for wear between them and means for securing said member in adjusted position.

2. In a construction as defined in claim 1, means carried by one of said sections arranged and adapted to engage the body portion of the other section when the bores are in axial alignment for securing the sections together against angular movement relatively.

3. A coupling comprising a male section and a female section each provided with a bore therethrough, separate means on each of said sections respectively arranged and adapted to coact upon movement of the sections from an angular position relatively with the sections uncoupled to a tightly coupled position with their bores in axial alignment, said separate means respectively being formed to permit rotation of the sections relatively when the sections are in tightly coupled position and locking means arranged and adapted to secure the sections against angular movement relatively when in tightly coupled position while permitting rotation of the parts relatively.

4. A coupling comprising a male section and a tubular female section each provided with a bore therethrough, means on said male section and means on said female section arranged and adapted to coact upon movement of the sections from an angular position relatively with the sections uncoupled to a tightly coupled position with their bores in axial alignment, said means on the male section including an annular ring threadedly mounted thereon for movement axially of the section, and the means on the female section including a substantially semi-cylindrical portion formed with a semi-annular shoulder arranged and adapted to firmly seat against substantially one-half of the axially facing surface of said annular ring when the sections are coupled together whereby the sections are adapted to rotate relatively when in coupled position.

5. A coupling comprising a male section and a female section each provided with a bore therethrough, means on said female section arranged and adapted to coact upon movement of the sections from an angular position relatively with the sections uncoupled to a tightly coupled position with their bores in axial alignment, the bore of said female section being threaded and an annular ring threadedly engaging the threads thereof, said ring spaced from the ends of the bore, an annular resilient washer disposed against one side of said ring arranged and adapted to provide a seat for the end of the male section when the sections are in coupled position and a hose connection threadedly engaging the threads of the bore of the female member at the side of the ring opposite the washer, said ring being free of engagement of the connection whereby said ring is adapted for various adjustments axially of the bore independent of movement of the connection.

6. A coupling comprising a male section and a female section, said male section including an elongated tubular member having an inner and an outer end and formed at its outer end to seat against an annular washer and provided with an annular ring therearound at a point spaced from said outer end, said female section including a body provided with a bore therethrough an annular resilient washer secured within said bore, guide means on a side of said body arranged and adapted to engage the ring on the tubular member and to guide the tubular body from an uncoupled position in which the tubular body is disposed angularly relative to the female section with its outer end engaging said washer to a tightly coupled position in which the bore of the tubular member is in axial alignment with the bore of the female section, said annular ring being threadedly mounted on the tubular member for movement axially therealong for varying the distance between the point of engagement of the guide means therewith and the outer end of said tubular member whereby the pressure between the washer and outer end of the tubular member may be varied as desired.

7. A coupling comprising a male section and a female section each provided with a bore therethrough, means on said male section and means on said female section arranged and adapted to coact upon movement of said sections from an angular position relatively with the sections uncoupled to a tightly coupled position with their bores in axial alignment, the means on said female section including a substantially semi-cylindrical portion having inwardly projecting diametrically opposed portions on opposite sides thereof and the means on the male section comprising an annular shoulder provided therearound arranged and adapted to engage the opposed inwardly projecting portions on the female section upon moving the sections from uncoupled to coupled position, said semi-cylindrical portion being formed between the opposed inwardly projecting portions thereof to engage the side of the male section adjacent its annular shoulder when the sections are moved to coupled position to insure axial alignment of the bores.

JEROME L. TALLANT.
JOHN S. WRIGHT.